United States Patent
Medina et al.

(10) Patent No.: US 8,861,428 B2
(45) Date of Patent: Oct. 14, 2014

(54) DETECTION AND MITIGATION OF INGRESS INTERFERENCE WITHIN COMMUNICATION LINKS

(75) Inventors: Douglas Medina, Grain Valley, MO (US); Ronald Jones, Stilwell, KS (US); Michael Peck, Raymore, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 176 days.

(21) Appl. No.: 13/487,408

(22) Filed: Jun. 4, 2012

(65) Prior Publication Data

US 2013/0322326 A1 Dec. 5, 2013

(51) Int. Cl.
| | | |
|---|---|---|
| *H04B 7/185* | (2006.01) | |
| *H04B 1/04* | (2006.01) | |
| *H04B 1/06* | (2006.01) | |
| *H04L 5/00* | (2006.01) | |
| *H04B 15/02* | (2006.01) | |

(52) U.S. Cl.
CPC .............. *H04B 15/02* (2013.01); *H04L 5/0062* (2013.01)
USPC ....... 370/317; 455/114.2; 455/278.1

(58) Field of Classification Search
CPC ......... H04B 15/02; H04B 7/02; H04B 5/0062
USPC ............................................. 370/317
See application file for complete search history.

(56) References Cited

U.S. PATENT DOCUMENTS

| | | | |
|---|---|---|---|
| 4,099,121 A | 7/1978 | Fang | |
| 5,842,125 A | 11/1998 | Modzelesky et al. | |
| 6,112,085 A | 8/2000 | Garner et al. | |
| 8,594,559 B2 * | 11/2013 | Wichern | 455/3.02 |
| 2007/0098121 A1 * | 5/2007 | Casabona et al. | 375/346 |
| 2009/0216345 A1 | 8/2009 | Christfort | |
| 2010/0202575 A1 * | 8/2010 | Farag et al. | 375/346 |
| 2012/0147929 A1 * | 6/2012 | Malaga et al. | 375/147 |

* cited by examiner

*Primary Examiner* — Shaq Taha
(74) *Attorney, Agent, or Firm* — Guntin & Gust, PLC; Ralph Trementozzi

(57) ABSTRACT

A system and process that incorporates teachings of the subject disclosure may include, for example, an interference monitor configured to detect occurrences of unintended signals within a communications link. A communications link may carry a down-converted format of a satellite signal from an earth terminal to an integrated receiver and decoder for further network distribution. Depending upon the nature of any such detected unintended signals, the communications link can be "swapped out" for a redundant communications link carrying a down-converted format of the same satellite signal obtained by way of a redundant earth terminal. Other embodiments are disclosed.

19 Claims, 8 Drawing Sheets

600

DETECTION AND MITIGATION OF INGRESS INTERFERENCE WITHIN COMMUNICATION LINKS

FIELD OF THE DISCLOSURE

The subject disclosure relates generally to satellite communications and more specifically to failover operation of redundant elements of a satellite communication system.

BACKGROUND

Satellite earth terminals receive downlink streams from one or more satellite transponders, for example, operating in the C/Ku frequency bands. High bandwidth signals, such as multimedia signals, are generally received from a satellite using a high gain antenna. An example of such an antenna includes a dish reflector directing energy into a feed horn. The received broadcast signals, or streams, are generally grouped according to satellite transponders, with each transponder assigned a respective non-overlapping portion of the spectrum, or bandwidth. The received satellite signals are amplified and down converted, for example, by a device commonly referred to as an LNB—a combined Low Noise Amplifier (LNA) and block down converter. The LNB is typically located as close as possible to the satellite feed horn, down converting a group of transponder signals (e.g., sixteen) to an intermediate frequency. It is common in video broadcast applications for the intermediate frequency to be located within a portion of the electromagnetic spectrum referred to as L-band.

L-band represents a crowded region of the electromagnetic spectrum, supporting many activities, such as aeronautical radio-navigation, radio astronomy and maritime mobile satellite. Use of this region of spectrum, as described herein, related to video broadcast satellite applications, is not considered by frequency management organizations, such as the Federal Communications Commission (FCC) in the allocation of authorized users. Use of the L-band by video broadcast satellite users, is considered unnecessary, as they are referred to as "wired carriers." Although over-the-air signals are received in the C and Ku bands, the L-band intermediate frequency signals are transported from the LNB using cables or waveguides. Since the intermediate-frequency signals are protected from exposure to the ambient electromagnetic environment, it is presumed that sufficient protection from any radiated signals in the same frequency band will be provided by the wired carrier's cable or waveguide shielding. Unfortunately, problems can occur due to breaches in the cable or waveguide. Such breaches may result from corrosion, loose interconnections or water ingress. Such conditions left untreated would allow for ingress of ambient electromagnetic energy, which could, depending upon such features as amplitude, frequency and modulation, interfere with operation of the video broadcast satellite receiver system.

Fortunately, most of authorized L-band uses are relatively low power, such that any unwanted interference that happens to fall within the L-band may not result in perceptible interference to the video broadcast system. It may go undetected altogether. However, as utilization of the electromagnetic spectrum grows, it is likely that new applications may operate at higher levels. In particular, one potential application is 4G wireless broadband communications network that may operate terrestrial communications within the L-band (e.g., at 1525 and 1559 MHz). Such operations would likely operate at relatively high power, such that interference would result in perceptible interference.

BRIEF DESCRIPTION OF THE DRAWINGS

Reference will now be made to the accompanying drawings, which are not necessarily drawn to scale, and wherein.

DETAILED DESCRIPTION

Figure 1:
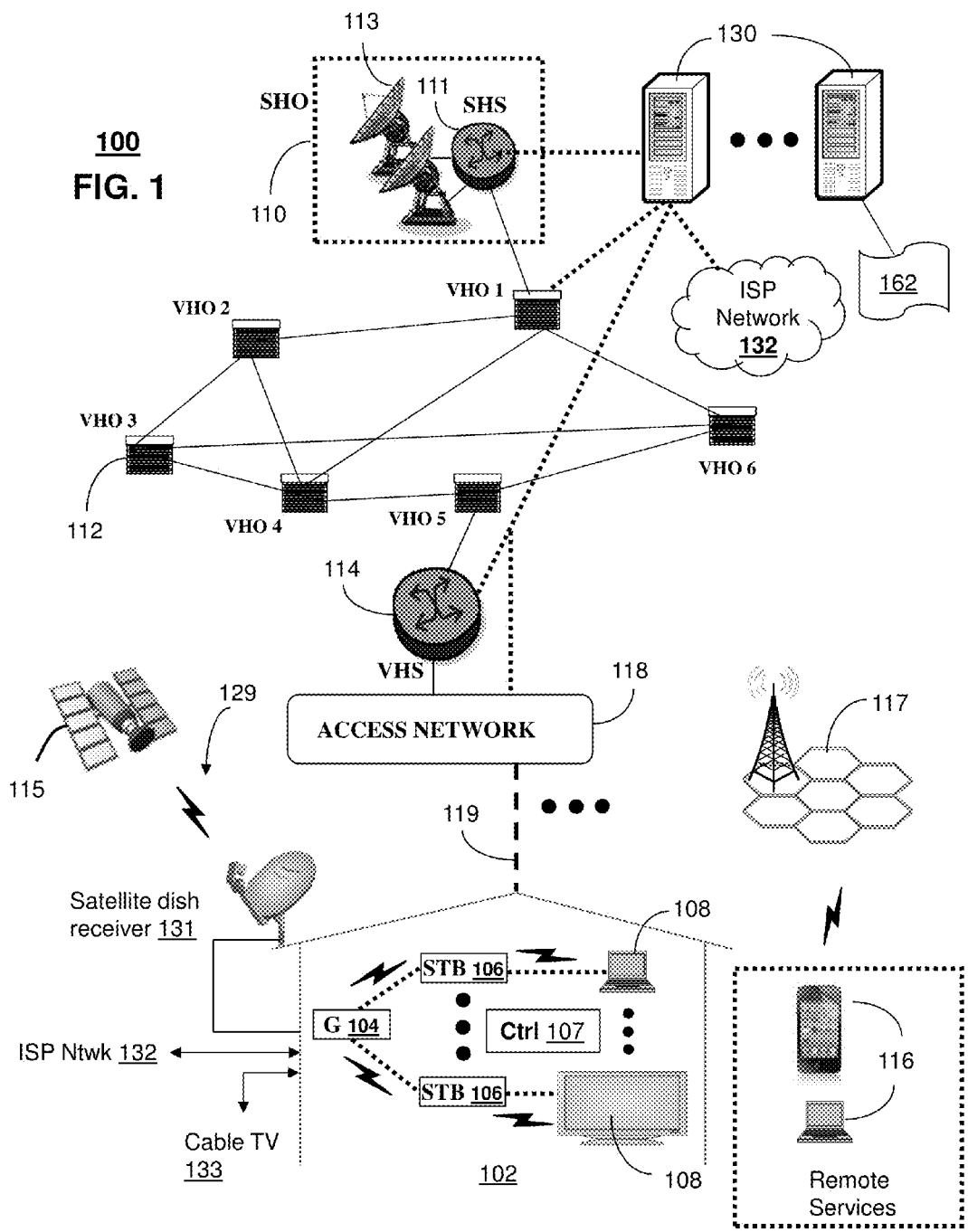
FIGS. 1-2 depict illustrative embodiments of communication systems that provide media services.

The subject disclosure describes, among other things, illustrative embodiments of a system and process for detecting occurrences of unintended signals coupling into a communications link carrying a down-converted satellite signal from an earth terminal. Depending upon the nature of any such detected unintended signals, the communications link can be "swapped" out for a redundant communications link carrying a down-converted format of the same satellite signal obtained from a redundant earth terminal. Other embodiments are contemplated by the subject disclosure.

One embodiment of the subject disclosure includes a process, including receiving, by a system including at least one processor, by way of a first communications link, a down-converted satellite signal occupying a portion of an intermediate-frequency bandwidth. The down-converted satellite signal is provided by the system to a decoder that decodes the down-converted satellite signal resulting in a decoded broadcast signal for distribution through a multimedia distribution network. A redundant down-converted satellite signal is received by the system, by way of a second communications link. The redundant down-converted satellite signal occupies a portion of the intermediate-frequency bandwidth. An unintended signal is detected, by the system, within the intermediate-frequency bandwidth of the first communications link. A likelihood of interference with unintended signal is determined, by the system, for the received broadcast signal. Upon detecting the likelihood of interference exceeding a threshold, the down-converted satellite signal is substituted, by the system, at the receiver with the redundant down-converted satellite signal.

One embodiment of the subject disclosure includes a system, including a memory storing computer instructions; and a processor coupled to the memory, wherein the processor, responsive to executing the computer instructions, performs operations including receiving, by a system including at least one processor, by way of a first communications link, a down-converted satellite signal occupying a portion of an intermediate-frequency bandwidth. The down-converted satellite signal is provided by the system to a decoder that decodes the down-converted satellite signal resulting in a decoded broadcast signal for distribution through a multimedia distribution network. A redundant down-converted satellite signal is received by the system, by way of a second communications link. The redundant down-converted satellite signal occupies a portion of the intermediate-frequency bandwidth. An unintended signal is detected, by the system, within the intermediate-frequency bandwidth of the first communications link. A likelihood of interference with unintended signal is determined, by the system, for the received broadcast signal. Upon detecting the likelihood of interference exceeding a threshold, the down-converted satellite signal is substituted, by the system, at the receiver with the redundant down-converted satellite signal.

One embodiment of the subject disclosure includes a non-transitory computer-readable storage medium, comprising computer instructions which, responsive to being executed by at least one processor, cause the at least one processor to perform operations comprising detecting, by a system including at least one processor, an unintended signal within a communication link of a satellite receiver. Determining likelihood of interference from the unintended signal that causes signal distortion at end user equipment receiving a signal conveyed by the communication link of the satellite receiver. Responsive to detecting that a likelihood of interference exceeds a threshold, a communications link of a satellite receiver is substituted with a redundant communications link of the satellite receiver, conveying the same signal as the communication link.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite 113 and/or terrestrial communication systems. The satellite communication system 113 can include one or more of the features disclosed herein. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Communication system 100 can also provide for all or a portion of the computing devices 130 to function as a network management controller (herein referred to as network management controller 130). The network management controller 130 can use computing and communication technology to perform function 162, which can include among other things, a fault management process, configuration management process, performance management process and/or security management process. Such features can control rules for establishing a controlled failover or switchover of redundant satellite communications links in response to various events, such as a detection of interference, receipt of an alarm, or the like.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Figure 2:
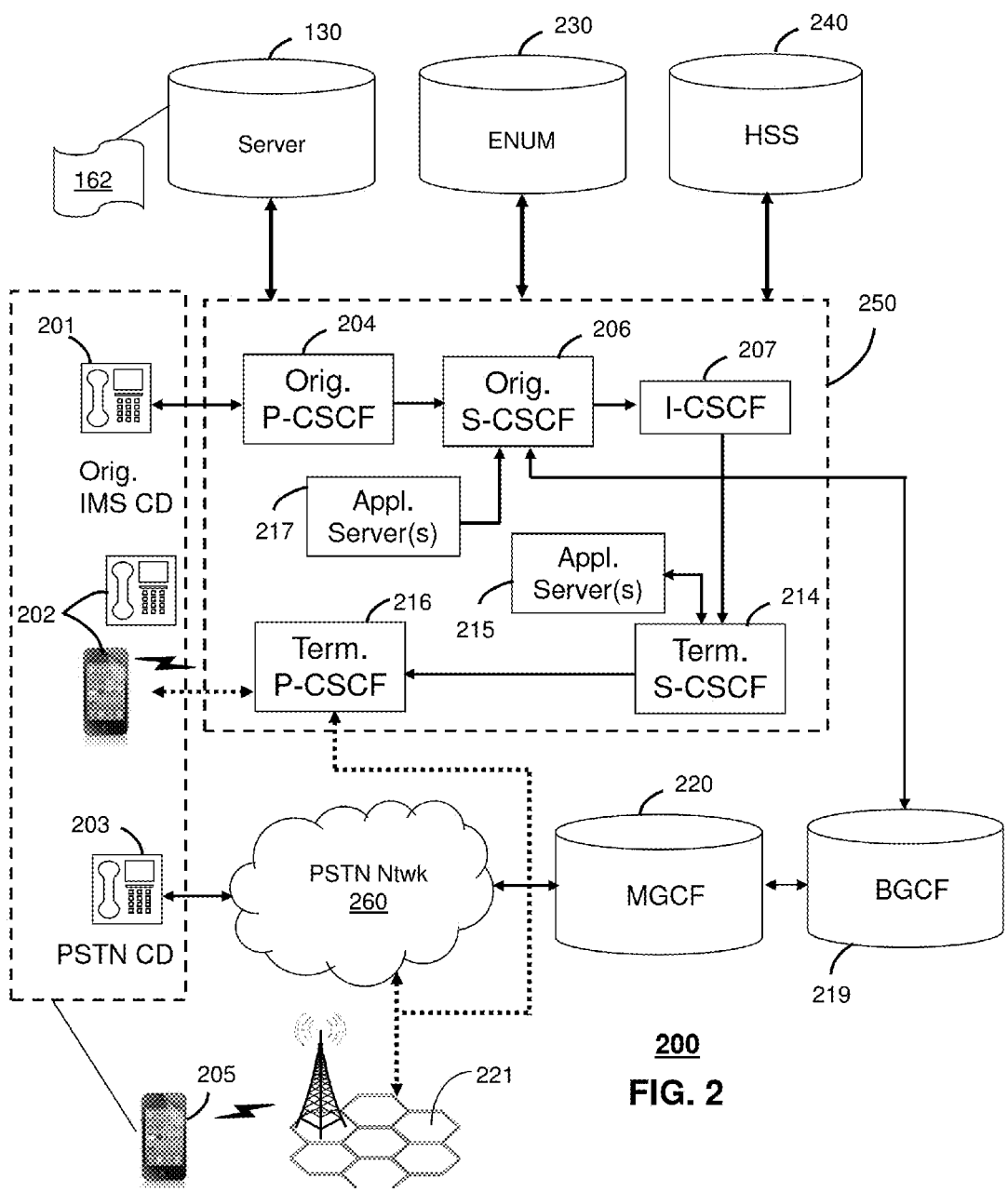

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The network management controller 130 of FIG. 1 can be operably coupled to the second communication system 200 for purposes similar to those described above. It is further contemplated by the subject disclosure that network management controller 130 can perform function 162.

The network management controller 130 of FIG. 1 can be operably coupled to the second communication system 200 for purposes similar to those described above. It is further contemplated by the subject disclosure that the application server 217 can be adapted to perform function 162.

Figure 3:
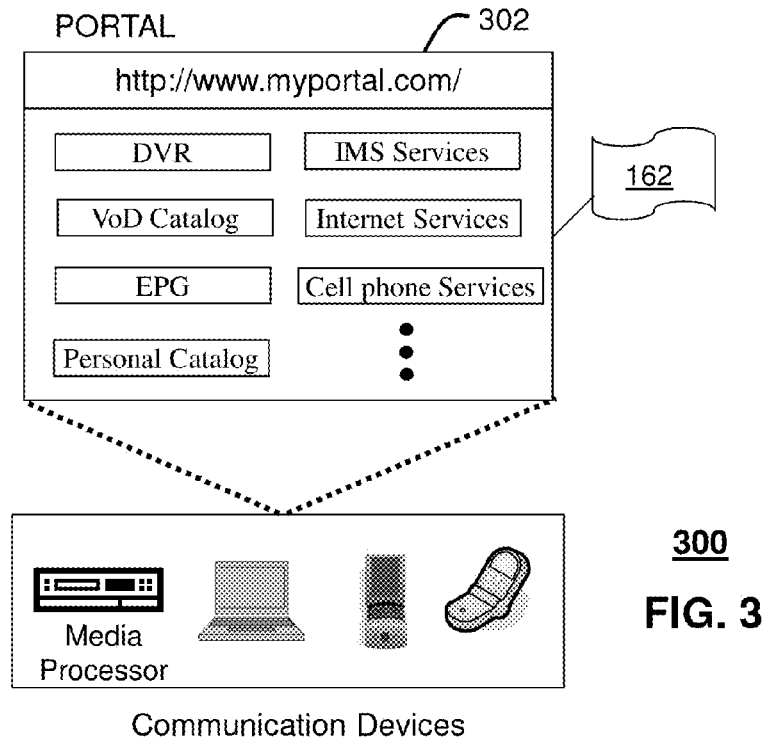
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision the network 162 to adapt the network as may be desired by network managers.

Figure 4:
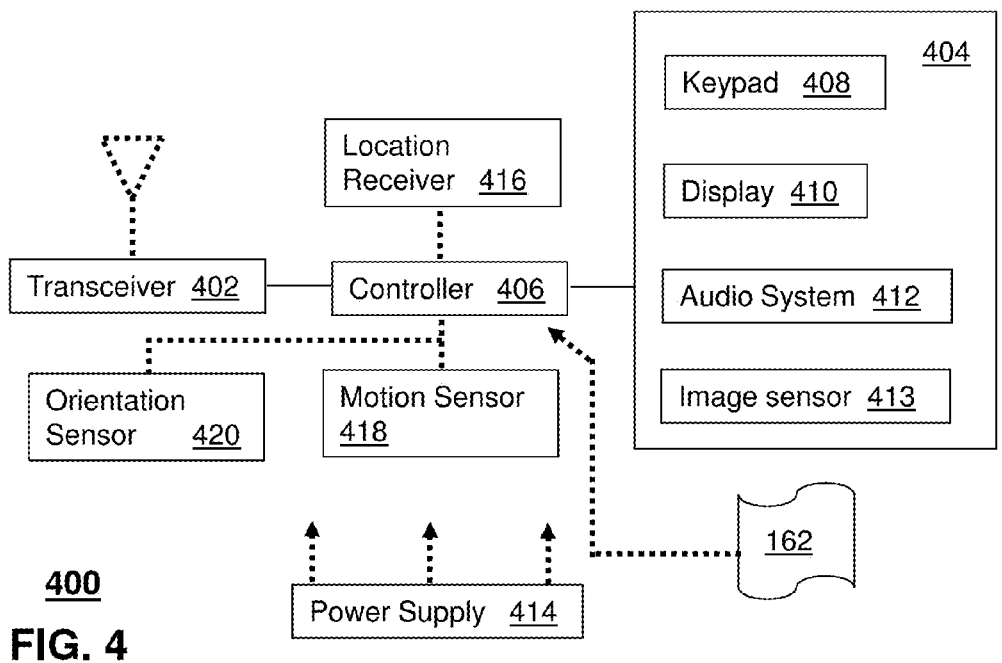
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the function 162.

Figure 5:
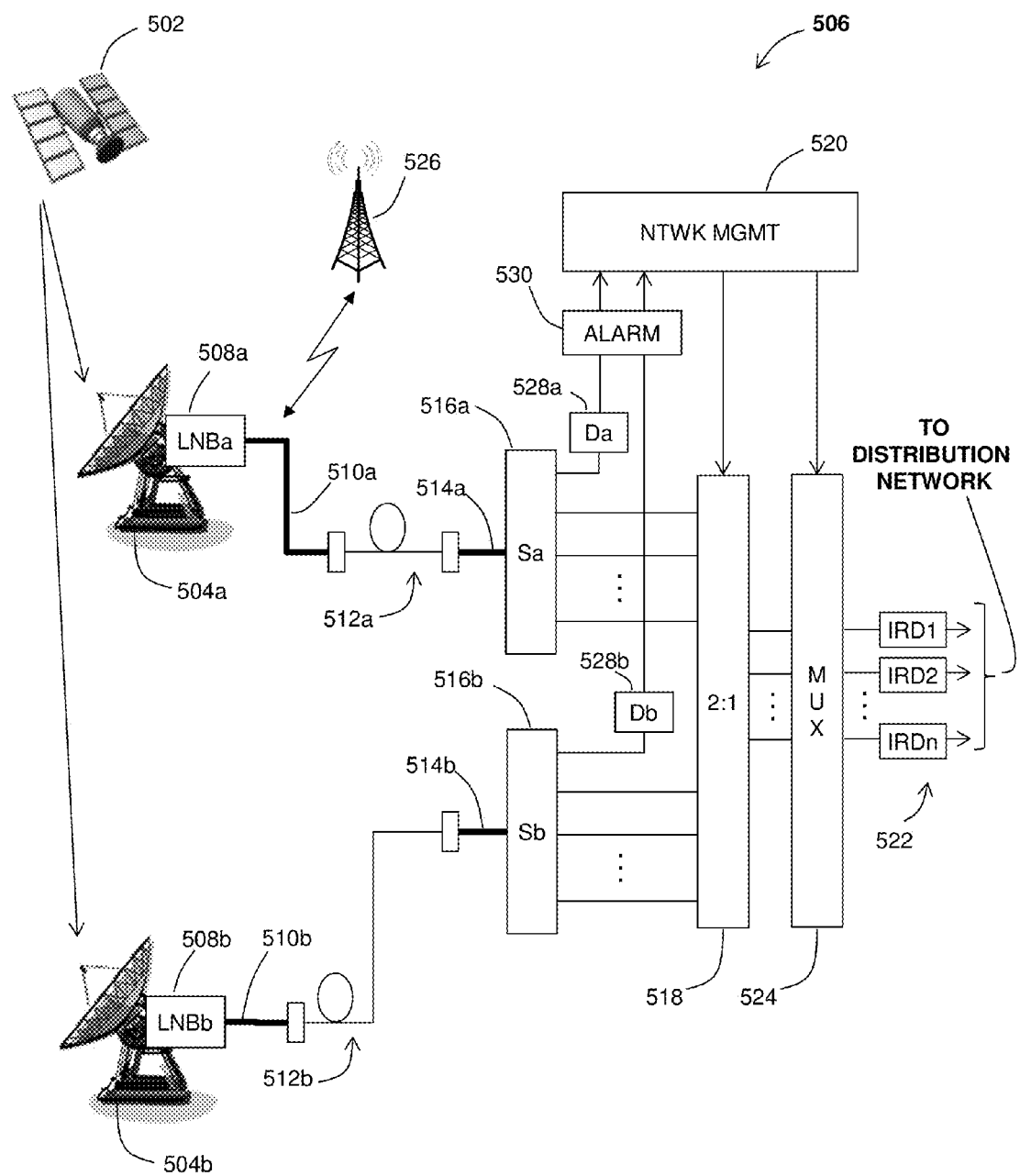
FIG. 5 depicts an illustrative embodiment of a satellite receiver system utilized in FIG. 1, that switches out redundant components upon detected interference.

It is contemplated by the subject disclosure that the satellite receiver system 500 shown in FIG. 5 or portions thereof can serve as a representation of one or more of the devices of communication systems 100-200. As part of a satellite communication system, multimedia broadcast signals are broadcast from a satellite 502. The multimedia signals broadcast from the satellite 502 within one or more of the C/Ku bands, or other suitable frequency bands, are received by a satellite earth terminal 504a, located within a footprint on the surface of the earth of the satellite's transponder(s) carrying the intended broadcast. The satellite earth terminal 504 may contain a high gain antenna, such as a reflector antenna, directing received signals into a feed horn. The received signals are routed from the feed horn to a nearby LNB 508a, within which they are amplified and down-converted to an intermediate frequency. In the illustrative examples discussed herein, the intermediate frequency band is a portion of the electromagnetic spectrum, generally known as the L-band, extending from about 950 MHz to about 2,100 MHz. An L-band output signal, generally preserving the satellite transponder signals, is routed to a receiver facility 506, for example, at the SHO 110 (FIG. 1). In particular, the L-band output of the LNB can be routed from the satellite earth terminal 504a to a nearby equipment shed, using a low-loss, shielded waveguide, such as a hard-line coaxial cable assembly 510a. At the equipment shed, the L-band radio frequency signal can be converted to an optical signal and routed over a fiber optic link 512a to the receiver facility 506, whereupon the optical signal transported over the fiber optic network 512a is again converted back into a radio frequency L-band signal.

Also shown, is a redundant satellite earth terminal 504b, located within the same footprint of the satellite's broadcast. The redundant satellite earth terminal 504b may contain a high gain antenna, a feed horn and a nearby LNB 508b. An L-band output signal, preserving the satellite transponder signals is routed to the same receiver facility 506. In particular, the L-band output of the LNB 508b can be routed in a similar manner from the satellite earth terminal 504b to a nearby equipment shed, again using a low-loss, shielded waveguide, such as a hard-line coaxial cable assembly 510b. At the equipment shed, the redundant L-band radio frequency signal can be converted to an optical signal and routed over a second fiber optic link 512b, albeit much longer, to the same receiver facility 506, whereupon the optical signal transported over the fiber optic network 512b is once again converted back into a redundant radio frequency L-band signal, carried in a respective coaxial cable 514a. In at least some applications, the redundant satellite earth terminal 504b is geographically remote from the first satellite earth terminal 504a. For example, the satellite earth terminal 504a and the redundant satellite earth terminal 504b are separated by more than a radio line of sight distance between them.

Each of the respective L-band satellite broadcast signals received at the receiver facility 506 can be split, for example, using a respective passive splitter device 516a, 5a6b, into a group of substantially identical L-band signals, e.g., sixteen such signals. Each group of L-band signals can be coupled to a respective group of input ports of a switch 518. The switch 518 is referred to as a 2:1, or redundancy, or failover switch.

The switch 518 selectively couples one of the groups of signals from a respective one of the passive splitters 516a, 516b, to a common output group of L-band signal ports. Thus, at any given time, only one of the groups of L-band signals from a respective one of the passive splitters 516a, 516b is in electrical communication with the output group of L-band signal ports. In at least some embodiments, the switch 518 has a control input that can be driven by a controller, such as a network management controller 520.

Each L-band output port of the switch 518 can be coupled to a respective integrated receiver and decoder device 522 of a bank of such devices 522. The integrated receiver decoder devices 522, generally down convert the L-band radio frequency signal and otherwise decode it to obtain baseband data. Each one of the bank of integrated receiver and decoder devices 522 can be used to obtain digital information from a respective one of the satellite transponders. The transponders can broadcast signals that are tens of MHz wide. For example, each decoded transponder signal might include 5 or 6 high-definition video streams, or 12 to 15 standard definition video streams. Additional multiplexing can be applied, for example, to extract one or more streams from each of the transponder signals.

In at least some embodiments, a multiplexer 524 or similar switching or reconfiguration device is coupled between the L-band output ports of the switch 518 and the bank of integrated receiver and decoder devices 522. Such a multiplexer 524 can also be operated under the control of the network management controller 520. Thus, the network management controller 520 can control which satellite earth terminal 504a, 504b is being used for signal reception at the receiver facility 506, and how the split L-band signals are interconnected or otherwise routed to respective ones of the bank of integrated receiver and decoder devices 522.

Operation of the failover switch 518 can be undertaken for any of a number of different reasons, generally to ensure as little or no interruption to data service to end users or subscribers of the multimedia content. For example, satellite earth terminals require occasional scheduled maintenance. During such periods of maintenance at one of the satellite earth terminal 504a, the switch can be operated to obtain satellite signals from the redundant satellite earth terminal 504b. Such a pre-scheduled switchover can be accomplished during periods of lower viewer activity, and preferably coincident with an event, such between programs, or aligned with data frames, so as to minimize any interruption to the end users.

Alternatively or in addition, the 2:1 switch 518 can be operated to make a similar change between the satellite earth terminal 504a and the redundant satellite earth terminal 504b for unscheduled operational reasons. An example of such a reason might include weather at one satellite earth terminal 504a reducing a link margin and leading to a reduction in a ratio of energy per bit to noise power spectral density ($E_b/N_0$). Due to the geographical separation, the same weather may not be affecting the other satellite earth terminal 504b. In this situation, a switch to the redundant satellite earth terminal 504b should restore or otherwise maintain reliable delivery of multimedia service. Still other reasons may relate to hardware issues or a satellite earth terminal's position within the transponder footprint. Such issues may result in a reduction of received signal amplitude, otherwise compromising $E_b/N_o$ performance. In each of these scenarios, the network management controller 520 can impose a switchover, for example, upon scheduled events and/or upon monitoring degradation to $E_b/N_0$. It should be noted, however, that such events requiring an unscheduled switchover typically result from a reduction in the received signal energy of the intended signal(s).

Also shown in FIG. 5, is a source of interfering electromagnetic energy 526 residing within the general vicinity of the satellite earth terminal 504a (e.g., within radio line of sight). For example, the source can result from an unrelated terrestrial communication link. To the extent that the shielding and interconnections of the hard-line coaxial cable assembly of the first communications link are functioning properly, the cable shielding should provide sufficient protection to preventingress of the interfering electromagnetic energy 526. However, to the extent that the hard-line coaxial cable assembly 510a has been compromised in any way, for example, by having a loose connector, a cut shield, corrosion, or water ingress, such compromises may allow ingress of the interfering electromagnetic energy 526 into the intermediate frequency, e.g., L-band, communications link. Depending upon characteristics of the ingress of the interferer 124, its presence within the communication link can lead to perceived errors by the end users, without necessarily leading to a reduction in $E_b/N_0$.

Figure 6:
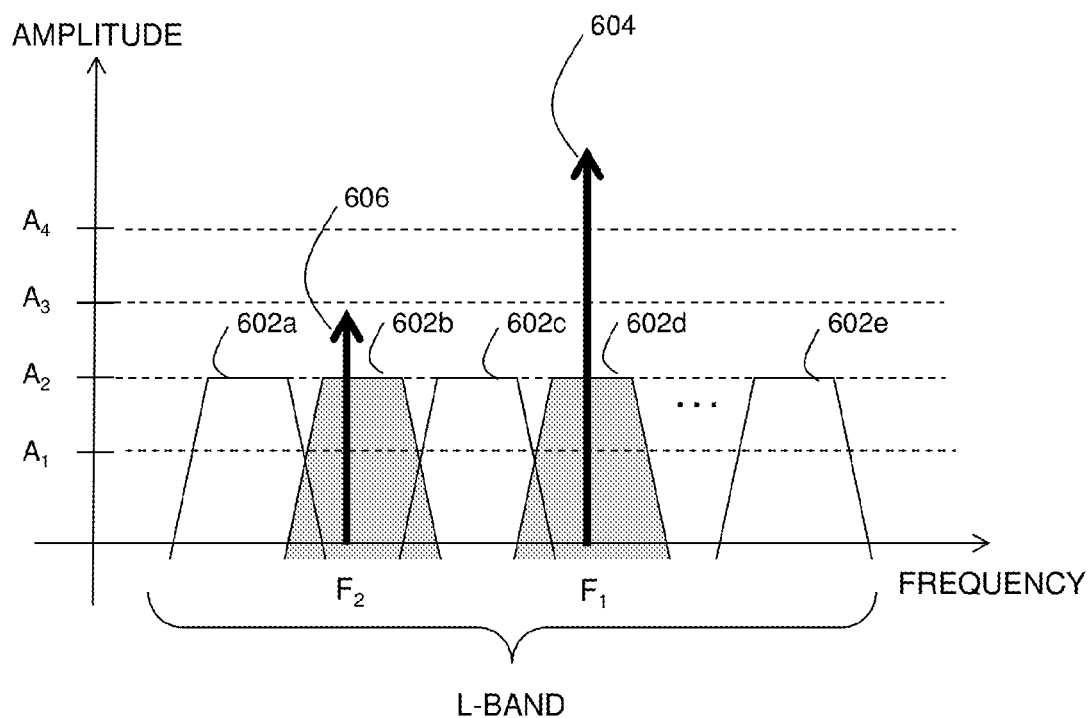
FIG. 6 depicts an illustrative spectrum of sampled electromagnetic energy within an intermediate frequency communication link of the satellite receiver utilized in FIG. 1 and FIG. 6.

Referring next to FIG. 6, a spectral representation 600 of an example down-converted L-band signal is shown. The signal includes a number of adjacent, non-overlapping signal spectra 602a, 602b, 602c, 602d and 602e (generally 602), resulting from contributions of individual transponders of the satellite 502 (FIG. 5). Also represented are two interfering signals 604 and 606 resulting from ingress of unintended signals into the L-band communications link. A first one of the interfering signals 604 is centered at a frequency $F_1$, and may result from a fundamental frequency of the interfering electromagnetic energy 526 (FIG. 5). For example, the first interfering signal might result from one of the LightSquared broadcast signals at one of the two center frequencies: 5L/10L centered around established frequencies of 1528 MHz and 5H/10H centered around 1552 MHz. If the interfering electromagnetic energy 526 is strong enough, it is possible that one or more of the interfering signals 604, 606 may result from harmonics, triple beat products, or other non-linear interference, that may occur at unpredictable frequencies, e.g., $F_2$.

Referring again to FIG. 5, an interference monitoring module 528a is coupled to an output port of the first passive splitter 516a, receiving a respective sample of the intermediate frequency, L-band signal obtained from the satellite earth terminal 504a through the first communications link, which includes the hard-line coaxial cable 510a, the fiber optic link 512a and any intervening components up to an input port of the interference monitoring module 528a. In at least some embodiments, an output of the interference monitoring module 528a is routed to an alarm module 530. The alarm module can be configured to generate an alarm responsive to detecting unintended signals within the first communications link that would be likely to interfere with intended L-band signals. For example, an alarm level can be established according to an absolute amplitude of the detected unintended signal 604, 606 (FIG. 6), a relative amplitude of the detected unintended signal 604, 606 in comparison to another signal or noise level, or some other attribute of the detected unintended signal 604, 606, such as its spectral energy, bandwidth, etc. Different alarms can be established for different scenarios. For example, alarm conditions can be categorized as "minor," "major," and "critical," depending upon one or more of the amplitude, frequency, and number of detected unintended signals 604, 606.

One or more of the interference monitoring module 528a and the alarm module 530 can be coupled to or otherwise in communication with the network management controller 520. The network management controller 520, in turn, can be programmed or otherwise configured to interpret such inputs and respond accordingly. An example of a response might include providing a network management notification as to a detection of a minor alarm, without a failover reconfiguration. In response to a major or critical alarm, the network management controller 520 can send a signal to the redundancy switch 518, inducing a failover reconfiguration from one satellite earth terminal 504a to another 504b. It is important to note that such a failover can occur not from detecting a drop in signal strength or $E_b/N_0$, but from in increased signal energy resulting from the presence of unintended signals within the L-band resulting from ingress into the communication link. With sufficient geographic separation between earth terminals 504a, 54b, it is unlikely that the same interfering electromagnetic energy 526 would be present at the other terminal. Even if it were, the interference likely resulted from a defect of some sort, which would not necessarily exist at the alternate earth terminal.

In some embodiments, the network management controller 520 can be programmed or otherwise configured to generate a maintenance notice upon detection of such a failover. The maintenance notice can include particulars related to the failover event, such as the time, date, alarm type, signal strength, signal frequency, etc. Such information would be helpful to assist with correcting a compromised communication link.

Figure 7:
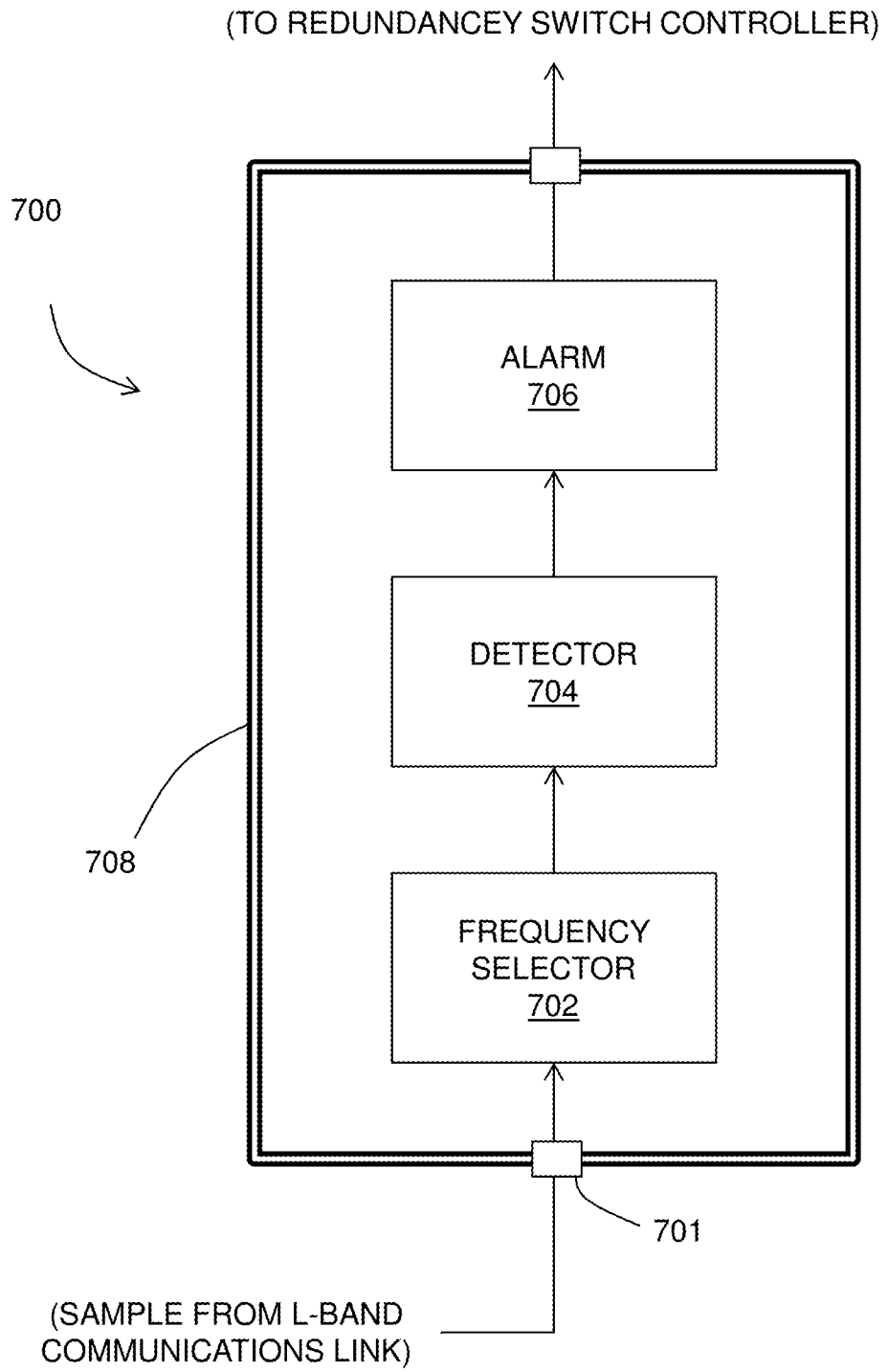
FIG. 7 depicts an illustrative block diagram of an interference monitor utilized in FIG. 5.

FIG. 7 illustrates an example embodiment of an interference monitoring module 700. The interference monitoring module 700 includes an input port 701 in communication with the sample port of the passive signal splitter 516a (FIG. 5). A sample obtained at the sample port is coupled to a frequency selector module 702. The frequency selector module 702 can include one or more filters, such as one or more of a notch filter, a low-pass filter, a high-pass filter, and a band-pass filter. The filters can be constructed from any suitable technology, such as lumped elements, microstrip circuits, surface acoustic wave devices, and the like. In some embodiments, it is envisioned that the obtained sample stream can be converted to a digital stream, for example, using an analog-to-digital converter. In such scenarios, filtering and other signal processing as may be advantageous within the interference monitoring module 700, can be accomplished using digital signal processing techniques.

In some embodiments, the frequency selector module 702 is fixed tuned to one or more frequencies, such as established frequencies of a known interference source 528, e.g., $F_1$, $F_2$ (FIG. 6). Such fixed tuned techniques can be advantageous to detect ingress as may result from compromise to the communications link. Alternatively or in addition, the frequency selector can be tunable. For example, the frequency selector can include one or more well established signal processing techniques to tune among more than one frequency. In some embodiments, such a tunable frequency selector 702 can be configured to tune across a substantial portion of the L-band spectral bandwidth, e.g., 900 MHz to 1,200 MHz, at a tuning step size, e.g., 0.5 MHz. Such a tunable configuration would be advantageous in tracking unknown sources of interference in addition to known sources, for example, resulting from non-linear effects including harmonics, triple beats, intermodulation, spurious emissions, and the like.

An output of the frequency selector module 702 can be provided to a detector circuit 704. For example, the detector module 704 can be a power detector, such as a square law detector. In the illustrative embodiment, an alarm module 706 is included within the interference monitoring module and in communication with the detector module 704, obviating any need for a separate alarm module 530, as discussed above in relation to FIG. 5. In at least some embodiments, one or more of the frequency selector module 702, the detector module 704 and the alarm module 706 are contained within a shielded enclosure 708.

Shielding performance of such a shielded enclosure 708 can be established according to a specified shielding rating. Such shielding would be advantageous to avoid contamination of L-band samples obtained from the communication link. For example, the shielded enclosure 708 can be configured, through acceptable practices known to those skilled in the art of mitigating electromagnetic interference, to provide a specified isolation or shielding profile across a range of frequencies. Such isolation preferably attenuates the coupling of radiated electromagnetic energy from any interfering signals, such as those resulting from interference sources within the L-band, to the detector module 704. Preferably, any coupling of such interfering signals through the shielded enclosure 708 would be attenuated below a minimum detectable interference signal level to ensure that the detector module 704 is able to discern detected interference within the first or second communication links from radiated ambient interference present at the detector module 704.

Figure 8:
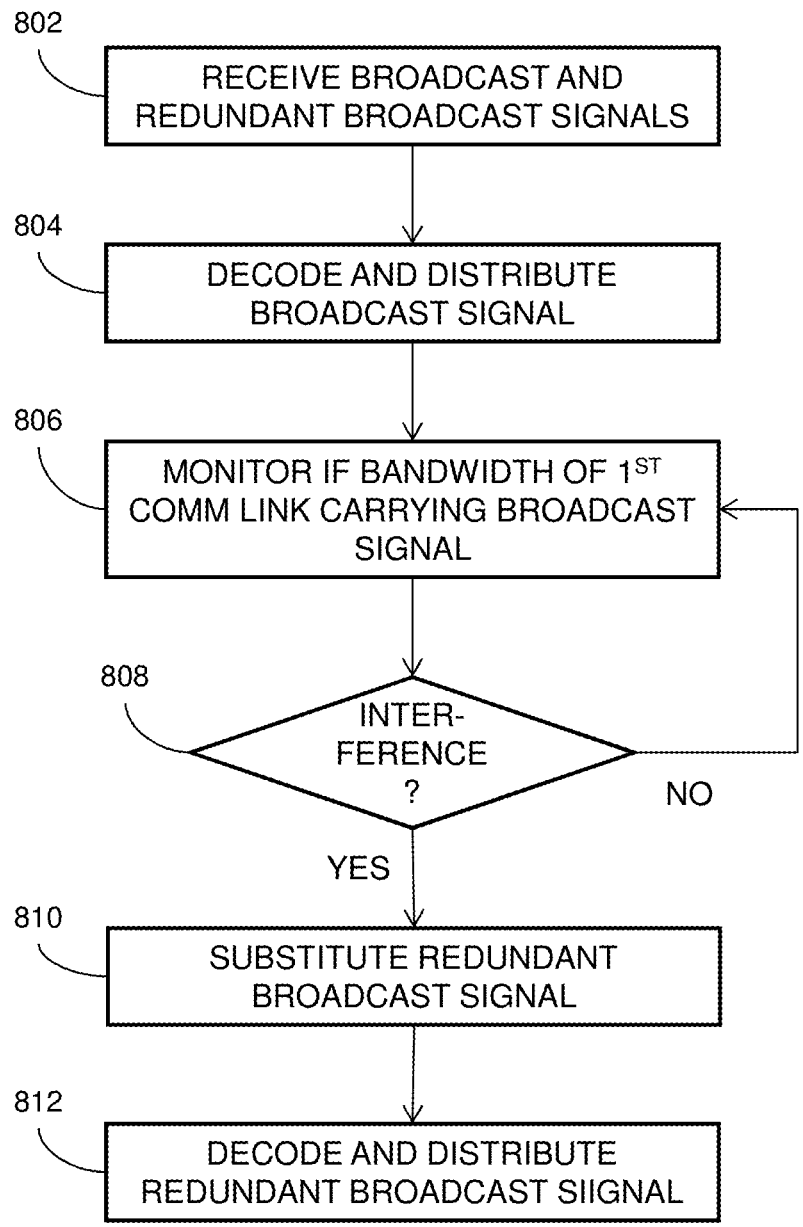
FIG. 8 depicts an illustrative embodiment of a method operating in portions of the systems described in FIGS. 1-7.

FIG. 8 depicts an illustrative process 800 that operates in portions of the devices of FIGS. 1-7. The process 800 can begin with step 802 in which broadcast and redundant broadcast signals are received. Such signal can include the intermediate frequency (i.e., L-band) signals received at the receiver site 506 from each of the satellite earth terminal 504a and the redundant satellite earth terminal 504b (FIG. 5). The received broadcast signal can be decoded and distributed at step 804. For example, the received L-band signal received by the first communications link can be divided by the passive splitter 516a (FIG. 5), and routed to an appropriate number of the integrated receiver and decoder devices 522. Outputs from the integrated receiver and decoder devices 522 can be distributed through an appropriate communications network such as those disclosed herein in relation to FIGS. 1-4. This could be considered a normal operation scenario.

At step 806, at least a portion of the bandwidth of the first communications link carrying an intermediate frequency of the broadcast signal is monitored for any interference, such as determined by presence of an unintended signals. As long as no interference is detected at step 808, monitoring continues under normal operations. However, upon the detection of interference at step 808, the broadcast signal is substituted with the redundant broadcast signal. For example, the redundancy switch 518 (FIG. 5) redirects redundant broadcast signals from the second passive splitter 516b to the bank of integrated receiver decoder devices 522. After the failover, the integrated receiver and decoder devices 522 decode and distribute the broadcast signal at step 812 to reestablish normal operations using the redundant broadcast signal. Since the broadcast signal and the redundant broadcast signal are substantially the same, distribution of multimedia streams obtained from the satellite is maintained in a relatively seamless manner.

Upon reviewing the aforementioned embodiments, it would be evident to an artisan with ordinary skill in the art that said embodiments can be modified, reduced, or enhanced without departing from the scope and spirit of the claims described below. For example, instead of satellite signals, interference monitoring and redundancy can be provided for virtually any electromagnetic communications circuit, such as terrestrial communications. Also, the particular signal frequency bands, such as L-band operation for the intermediate frequency are provided as illustrative examples only, and in no way limit application of the techniques disclosed herein to other signals, and other frequency ranges of operation. Other embodiments are contemplated by the subject disclosure.

Figure 9:
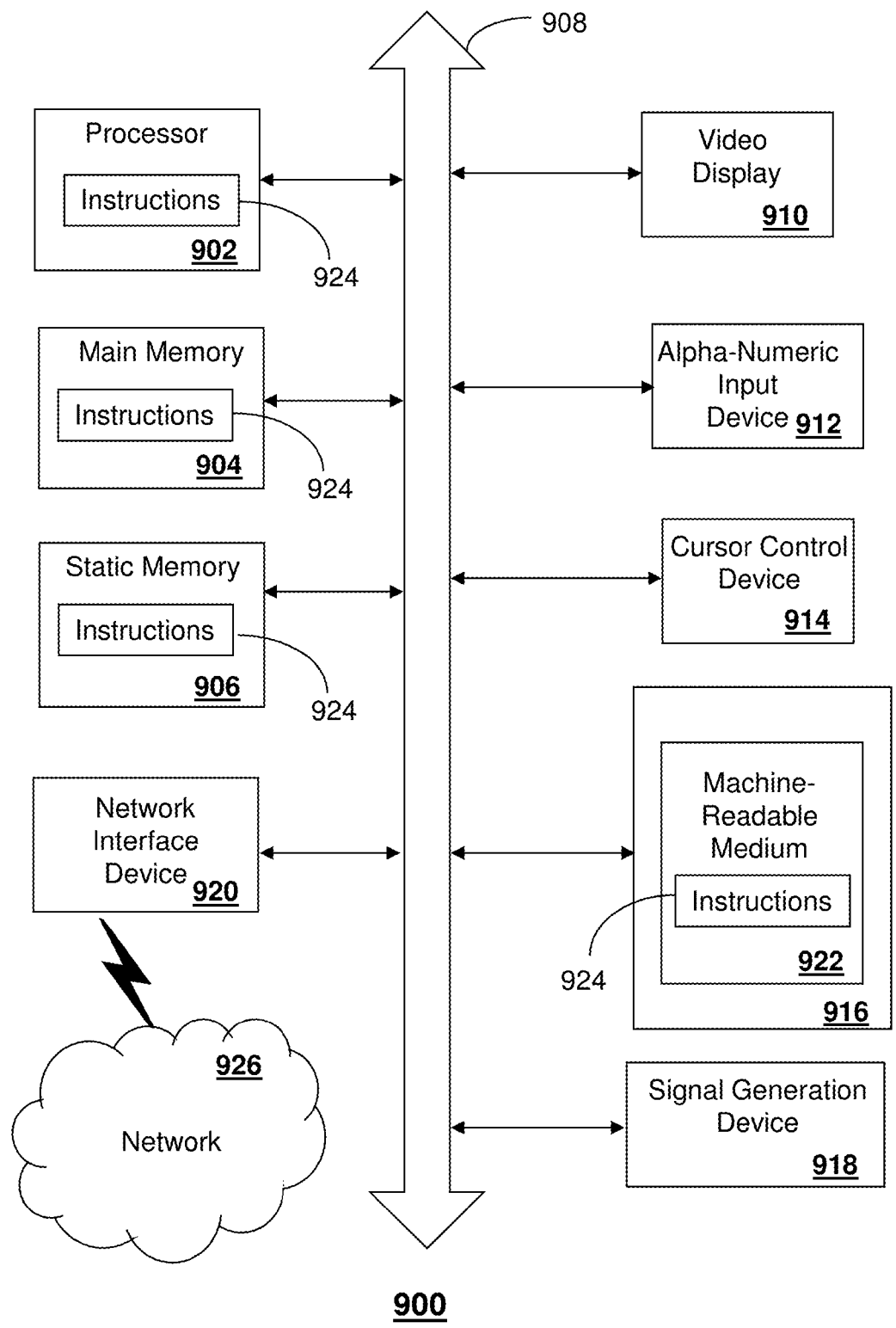
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods discussed above. One or more instances of the machine can operate, for example, as one or more of the alarm module 530, 706, the network management controller 520, the media processor 106 and other devices of FIGS. 1-7. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a system including a processor, by way of a first communications link, a down-converted satellite signal occupying a portion of an intermediate-frequency bandwidth;
   providing, by the system, the down-converted satellite signal to a decoder that decodes the down-converted satellite signal resulting in a decoded broadcast signal for distribution through a multimedia distribution network;
   receiving, by the system, by way of a second communications link, a redundant down-converted satellite signal occupying the portion of the intermediate-frequency bandwidth;
   detecting, by the system, for the first communications link, an unintended signal within the intermediate-frequency bandwidth;
   determining, by the system, for the unintended signal, an interfering signal;
   causing, by the system, the decoder to substitute the down-converted satellite signal with the redundant down converted satellite signal responsive to detecting that the interfering signal exceeds a threshold; and
   initiating, by the system, an alarm signal responsive to detecting the interfering signal exceeding the threshold.

2. The method of claim 1, wherein determining, by the interfering signal system, the interfering signal comprises:
   comparing, by the system, the unintended signal to a signal threshold; and
   determining, by the system interference to the decoded broadcast signal, responsive to the unintended signal being greater than the signal threshold.

3. The method of claim 2, wherein the intermediate-frequency bandwidth occupies an L-band region of an electromagnetic spectrum.

4. The method of claim 1, wherein detecting the unintended signal comprises tuning, by the system, a receiver to a fixed frequency within the intermediate-frequency bandwidth.

5. The method of claim 1, wherein detecting the unintended signal comprises causing, by the system, a receiver to scan across a plurality of frequencies within the intermediate-frequency bandwidth.

6. The method of claim 5, wherein the plurality of frequencies are separated by not more than 0.5 MHz.

7. The method of claim 1, wherein determining the interfering signal, comprises:
   quantifying, by the system, the unintended signal as a quantified interferer;
   comparing, by the system, the quantified interferer to a pre-established threshold, wherein the alarm signal is initiated responsive to the quantified interferer exceeding the pre-established threshold.

8. The method of claim 7, wherein quantifying the unintended signal comprises determining, by the system, a signal amplitude.

9. The method of claim 7, wherein the alarm signal is indicative of one of a plurality of different alarm levels.

10. A system, comprising:
a memory storing executable instructions; and
a processor coupled to the memory, wherein the processor, responsive to executing the instructions, performs operations comprising:
receiving by way of a first communications link, a down-converted satellite signal occupying a portion of an intermediate-frequency bandwidth;
providing the down-converted satellite signal to a decoder that decodes the down-converted satellite signal resulting in a decoded broadcast signal for distribution through a multimedia distribution network;
receiving by way of a second communications link, a redundant down-converted satellite signal occupying the portion of the intermediate-frequency bandwidth;
detecting for the first communications link, an unintended signal within the intermediate-frequency bandwidth;
determining for the unintended signal, interference with the decoded broadcast signal;
causing the decoder to substitute the down-converted satellite signal with the redundant down converted satellite signal responsive to detecting that the interference exceeds a threshold; and
generating an alarm signal responsive to detecting the interference exceeding the threshold.

11. The system of claim 10, wherein providing the down-converted satellite signal to a decoder comprises providing the down-converted satellite signal to an integrated receiver and decoder that tunes and decodes the down-converted satellite signal resulting in a decoded broadcast signal for distribution through a multimedia distribution network.

12. The system of claim 11, wherein the alarm signal is indicative of one of a plurality of different alarm levels.

13. The system of claim 10, wherein the processor, responsive to executing the instructions, performs operations comprising fixed tuning a signal monitor for detecting, for the first communications link, an unintended signal within the intermediate-frequency bandwidth.

14. The system of claim 10, wherein the processor, responsive to executing the instructions, performs operations comprising tuning a signal monitor within a range of frequencies for detecting, for the first communications link, an unintended signal within the intermediate-frequency bandwidth.

15. The system of claim 14, wherein the range of frequencies extends from at least about 900 MHz to at least about 2,100 MHz.

16. The system of claim 15, wherein the processor, responsive to executing the instructions, performs operations comprising tuning the signal monitor to within at least 0.5 MHz resolution within the range of frequencies.

17. A non-transitory machine-readable storage medium, comprising executable instructions which, responsive to being executed by a processor, cause the processor to perform operations comprising:
detecting an unintended signal within a communication link of a satellite receiver, wherein the satellite receiver receives, by way of a first communications link, a down-converted satellite signal occupying a portion of an intermediate-frequency bandwidth, wherein the satellite receiver also receives, by way of a second communications link, a redundant down-converted satellite signal occupying the portion of the intermediate-frequency bandwidth, and wherein the satellite receiver provides the down-converted satellite signal to a decoder that decodes the down-converted satellite signal resulting in a decoded broadcast signal for distribution through a multimedia distribution network;
determining for the unintended signal, interference to cause signal distortion at end user equipment receiving a signal conveyed by the communication link of the satellite receiver, the signal resulting in the decoded broadcast signal when decoded;
causing an alarm signal responsive to determining that the interference exceeds a threshold; and
substituting the communication link with a redundant communications link of the satellite receiver responsive to determining the interference, wherein the redundant communications link conveys a redundant signal equivalent to the signal conveyed by the communication link.

18. The non-transitory machine-readable storage medium of claim 17, wherein determining the interference comprises detecting an increased signal power in the signal received in the communications link.

19. The non-transitory machine-readable storage medium of claim 17, wherein detecting the unintended signal within the communications link comprises scanning a plurality of frequencies within a frequency range of the communications link.

* * * * *